United States Patent [19]

Longley et al.

[11] Patent Number: 5,231,149

[45] Date of Patent: Jul. 27, 1993

[54] METHOD OF FUNCTIONALIZING HYDROXY TERMINATED POLYCARBONATE WITH ISATOIC ANHYDRIDE

[75] Inventors: Kathryn L. Longley, Saratoga Springs, N.Y.; Susan J. Hathaway, Alpharetta, Ga.

[73] Assignee: General Electric Company, Schenectady, N.Y.

[21] Appl. No.: 759,283

[22] Filed: Sep. 13, 1991

[51] Int. Cl.$^5$ ............................................. C08G 64/42
[52] U.S. Cl. ..................................... 525/467; 525/462
[58] Field of Search ................................. 525/467, 462

[56] References Cited

U.S. PATENT DOCUMENTS

| | | | |
|---|---|---|---|
| 4,732,934 | 3/1988 | Hathaway et al. | 525/66 |
| 4,736,013 | 4/1988 | Hathaway et al. | 528/196 |
| 4,808,672 | 2/1989 | Hathaway et al. | 525/397 |
| 4,853,458 | 8/1989 | Gambale et al. | 528/198 |
| 4,959,411 | 9/1990 | Gambale et al. | 525/67 |

OTHER PUBLICATIONS

Isatoic Anhydride/4-Dimethylaminopyridine as a Reagent for ortho-Aminobenzoylation, Michael C. Venuti--1982 Georg Thieme Verlag-Stuttgart-New York-pp. 266-268.

*Primary Examiner*—Harold D. Anderson
*Attorney, Agent, or Firm*—William A. Teoli; William H. Pittman

[57] ABSTRACT

The cyclized carbonate of an amino aromatic acid, such as isatoic anhydride, or an acrylic acid halide, such as acryloyl chloride have been found useful in functionalizing hydroxy terminated polycarbonates.

3 Claims, No Drawings

METHOD OF FUNCTIONALIZING HYDROXY TERMINATED POLYCARBONATE WITH ISATOIC ANHYDRIDE

BACKGROUND OF THE INVENTION

The present invention relates to a method for making polycarbonates having terminal functionalized radicals, such as amine or vinyl radicals, and to the products obtained therefrom. More particularly, the present invention relates to the reaction of hydroxy terminated polycarbonates with reagents such as isatoic anhydride or an acrylic acid halide.

Although polycarbonates, such as polycarbonates obtained by using 2,2-bis-(4-hydroxyphenyl)-propane (bisphenol A), have been used in a variety of applications requiring high impact strength, it has generally been recognized that polycarbonates are often deficient in specific properties which curtails their use in particular instances. For example, the use of polycarbonates in automotive applications is limited because they have poor organic solvent resistance. As shown by U.S. Pat. No. 4,732,934, it is sometimes advantageous to functionalize polycarbonates so that blends of polycarbonates with other polymers, such as polyamides, can result in a product possessing improved properties over the respective components in the blend.

A convenient method for functionalizing polycarbonates is to start with polycarbonates having terminal hydroxy radicals which can be made by the procedure of Hathaway et al, U.S. Pat. No. 4,736,013 which is incorporated herein by reference. A dihydric phenol such as bisphenol A is phosgenated in the presence of a monotetrahydropyranyl ether salt of a dihydric phenol as a chain terminator. The hydroxy terminated polymer is then obtained by cleaving the tetrahydropyranyl group with oxalic acid or a hydrogen halide acid. Functionalization of the polycarbonate can be achieved by reacting the hydroxy terminated polycarbonate with a reagent such as trimellitic anhydride.

SUMMARY OF THE INVENTION

The present invention is based on the discovery that functionalized polycarbonates can be prepared from hydroxy terminated polycarbonates via solution functionalization with an acrylic acid halide, such as acryloyl chloride, or the cyclized carbonate of an amino aromatic acid, such as isatoic anhydride. The resulting amine or vinyl terminated polycarbonates can be further reacted thereafter with functionalized organic polymers, such as amine reactive polymers, for example, glycidyl methacrylate functionalized EPDM rubber, or free radical polymerizable olefinically unsaturated monomers or polymers, such as styrene or polybutadiene, to obtain polycarbonate organic block copolymers having enhanced impact strength and solvent resistance.

STATEMENT OF THE INVENTION

There is provided by the present invention, a method for making aromatic polycarbonates having terminal groups selected from

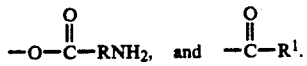

which comprises, (1) effecting reaction between an hydroxy terminated polycarbonate consisting essentially of chemically combined units of the formula,

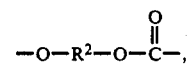

and a member selected from the class consisting of a cyclized carbonate of an amino aromatic acid and an acrylic acid halide in the presence of an acid acceptor, and (2) recovering the resulting functionalized aromatic polycarbonate from the mixture of (1), where R is a divalent $C_{(6-13)}$ arylene radical, $R^1$ is a $C_{(2-8)}$ alkenyl radical and $R^2$ is a $C_{(6-3)}$ divalent arylene radical.

There are included by the cyclized carbonates of amino aromatic acid which can be used in the practice of the present invention compounds such as isatoic anhydride. Additional compounds are for example, oxazolidine-2,5-dione or its derivatives such as N-carboxy-$\alpha$-amino acid anhydrides.

There are included by the acrylic acid halides which can be used in the practice of the present invention compounds such as acryloyl chloride or methacryloyl chloride.

Suitable dihydric phenols which can be used to make the hydroxy terminated polycarbonates used in the practice of the invention are, for example, 2,2-bis(2,hydroxyphenyl)propane, 2,4'-dihydroxybiphenylmethane, bis(2-hydroxyphenyl)methane, 2,2-bis-(4-hydroxyphenyl)propane, referred to hereinafter as "bisphenol A" or "BPA", 1,1-bis(4hydroxyphenyl)ethane, 1,1-bis(4-hydroxyphenyl 4,4'-dihydroxy-3,3', 5,5'tetramethylbiphenyl, 2,4-dihydroxybenzophenone, 4,4'-dihydroxydiphenylsulfone, 2,4'-dihydrosydiphenylsulfone, 4,4'-dihydroxydiphenylsulfoxide, 4,4'-dihydroxydiphenylsulfide, dichloro-2,2-bis (4-hydroxy(phenyl)ethylene, 6,6'-dihydroxy-3,3,3',3'-tetramethyl-bis-1,1'-spirobiindane,

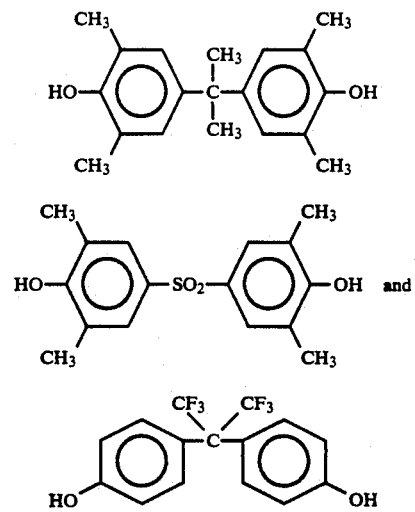

In the practice of the invention, the hydroxy terminated polycarbonate can be capped with either the cyclized amino carboxylic acid, such as isatoic anhydride or the acrylic acid halide by refluxing the components in an inert organic solvent in the presence of an acid acceptor. Suitable inert organic solvents are, for example, chlorobenzene, methylene chloride, chloroform, o-dichlorobenzene, or 1,2,4-trichlorobenzene.

Acidic acceptors which have been found effective are triethylamine, pyridine, N,N-dimethylaniline, and 4-dimethylaminopyridine.

End capping of the hydroxy terminated polycarbonate can be effected under reflux conditions over a period of from 2 to 24 hrs., depending upon the choice of organic solvent, and end capping reagents. The end capped polymer then can be isolated by precipitation using a suitable solvent such as an alkanol, for example, methanol.

Alkenyl capped polycarbonates made in accordance with the practice of the present invention can be further reacted with free radical polymerizable organic monomers and polymers utilizing a free radical initiator to produce copolymers useful as compatibilizers for blends of polycarbonate and organic polymers.

Amine terminated polycarbonates made in accordance with the practice of the present invention can be further reacted with amine reactive functional groups such as epoxide substituted polymers, for example, EPDM rubbers functionalized with glycidyl methacrylate.

Suitable impact modifiers may be used to enhance the impact resistance of polycarbonate-organic block copolymers made in accordance with the practice of the present invention. Preferred impact modifiers are those of the core/shell type because of their ability to greatly increase impact strength properties in the compositions disclosed herein. "Core/shell" as used herein is meant to describe any of the wide varieties of materials which contain a polymeric core physically and/or chemically associated with at least one surrounding shell of another polymeric material. Thus, core/shell modifiers include both materials formed from bonding, i.e., grafting between functional sites on the core and on an adjacent shell, and materials in which polymeric chains of the core merely interpenetrate polymeric chains of a shell, without grafting.

The impact modifiers may contain a rigid core surrounded by a non-rigid layer. Useful rigid materials are typically homopolymers or copolymers of methacrylate esters or aromatic vinyl compounds. Non-rigid materials can be derived from diene rubbers such as polybutadiene. These and other suitable core/shell impact modifiers useful in the presently disclosed invention are described in U.S. Pat. Nos. 4,584,345; 4,292,233; 4,180,494; 4,096,202; 4,034,013; and 3,808,180, all incorporated herein by reference.

In order that those skilled in the art will be better able to practice the present invention, the following examples are given by way of illustration and not by way of limitation. All parts are by weight unless otherwise indicated.

EXAMPLE 1

A hydroxy terminated polycarbonate was prepared in accordance with the procedure of Hathaway et al, U.S. patent 4,736,013. A 500 ml Morton flask equipped with a mechanical stirrer, water-cooled condenser, pH probe and subsurface gas inlet tube was charged with water (55 ml.), methylene chloride (65 ml.), triethylamine (2.5 ml. of a 5% solution, 1.0 mole %), 29.2 grams, (0.128 mole) of bisphenol A, and the sodium salt of monotetrahydropyranyl ether (2.0 grams, 4.7 mole %). After about 2 minutes, gaseous phosgene was introduced into the agitated charge for 20 minutes at a rate of 0.8 gram per minute while maintaining the pH at 10.0-11.0. The phase containing methylene chloride, i.e., the organic phase, was separated, washed with 1M HCl and then stirred with 30 ml. of concentrated HCl for 15 minutes. The ratio of HCl to the monotetrahydropyranyl ether salt was 5:1. The organic phase was water-washed five times and then poured into methanol to effect precipitation of product. The product was dried in a vacuum oven at 100° C. for about 15 hours. The weight average molecular weight of the product as measured by gel permeation chromatography (GPC) was 52,060. Fourier Transform analysis (FT-IR) showed a hydroxyl stretch at 3582 cm$^{-1}$. Furthermore, a high field proton NMR spectrum indicated that the tetrahydropyranyl group had been completely removed. Based on this evidence and method of preparation, the product was a polycarbonte having terminal hydroxyl radicals.

A mixture of 10.0 grams of the hydroxy terminated polycarbonate having (0.02 mmol) of hydroxy radicals, 0.05 grams (0.55 mmol) of acryloyl chloride, and 0.056 grams (0.55 mmol) of triethylamine was refluxed in 20 ml. of chlorobenzene for 24 hours under a nitrogen atmosphere. The mixture was allowed to cool to room temperature and then poured into methanol to effect precipitation of product. The product was washed twice with methanol and dried in vacuo. Based on method of preparation, there was obtained a vinyl capped polycarbonate joined to the polycarbonate block by ester linkages. The identity of the product was further confirmed by high field proton NMR, FTIR, and GPC.

Copolymer formation can be achieved by heating the vinyl capped polycarbonate with a free radical initiator, such as dicumyl peroxide, with a free radical polymerizable olefinically unsaturated monomer or polymer such as styrene or polybutadiene in solution (such as in 1,2,4trichlorobenzene) or in the melt at temperatures in the range of 150°-300° C. Following the reaction, non-copolymerized polycarbonate can be removed by dissolution in a suitable solvent such as chloroform.

EXAMPLE 2

The procedure of example 1 was repeated except that there was employed with 1 gram of the hydroxy terminated polycarbonate, 0.06 grams (0.4 mmol) of isatoic anhydride and 0.05 grams (0.4 mmol) of dimethylaminopyridine. The resulting mixture was refluxed for 1 hour. The mixture was allowed to cool to room temperature and then was precipitated into methanol. There was obtained a polycarbonate having terminal aminobenzoate groups having the formula,

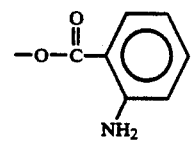

The polycarbonate was washed with methanol and then dried in vacuo. The polymer was analyzed by high field proton NMR, FTIR and GPC which further confirmed the identity of the product.

Copolymer formation can be achieved by heating the amine-functionalized polycarbonate with an amine reactive monomer or polymer such as polyethylene-graft-maleic anhydride, styrene-graft-maleic anhydride, or glycidyl methacrylate functionalized EPDM rubber in solution (such as in 1,2,4-trichlorobenzene) or in the melt at temperatures in the range of 150°-300° C. Following the reaction non-copolymerized polycarbonate can be removed by dissolution in a suitable solvent such as chloroform.

Although the above examples are directed to only a few of the very many variables which can be used in the practice of the present invention, it should be understood that the present invention is directed to a much broader variety of polycarbonates having functionalized end groups as set forth in the description preceding these examples.

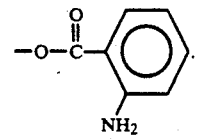

What is claimed is:

1. A method for making functionalized aromatic polycarbonates which comprises, (1) effecting reaction between an hydroxy terminated polycarbonate and isatoic anhydride in the presence of an acid acceptor and,
   (2) recovering the resulting functionalized aromatic polycarbonate from the mixture of (1).

2. A method in accordance with claim 1, where the aromatic polycarbonate is a bisphenol A polycarbonate.

3. A method in accordance with claim 1 where the terminal group has the formula,